United States Patent [19]

Peterson

[11] 4,182,273

[45] Jan. 8, 1980

[54] FEEDING APPARATUS

[76] Inventor: Maurice L. Peterson, Kerkhoven, Minn. 56252

[21] Appl. No.: 880,388

[22] Filed: Feb. 23, 1978

[51] Int. Cl.² ............................................. A01K 5/02
[52] U.S. Cl. ............................. 119/51.5; 119/52 AF
[58] Field of Search .............. 119/51.5, 51.11, 52 AF, 119/56 R

[56] References Cited

U.S. PATENT DOCUMENTS

| | | | |
|---|---|---|---|
| 2,111,190 | 3/1938 | McGuire | 119/51 |
| 2,766,725 | 10/1956 | Sievers | 119/51.5 |
| 3,074,377 | 1/1963 | Spencer | 119/54 |
| 3,527,191 | 9/1970 | Kawecki | 119/51.11 |
| 3,534,708 | 10/1970 | Cauffman | 119/51.11 |
| 3,536,046 | 10/1970 | Lippi | 119/51.5 |
| 3,547,081 | 12/1970 | Geerlings | 119/51.11 |
| 3,556,057 | 1/1971 | Icking | 119/51.5 |
| 3,613,641 | 10/1971 | Geerlings | 119/51.11 |
| 3,812,823 | 5/1974 | Ridder et al. | 119/54 |
| 4,051,812 | 10/1977 | DeLoach et al. | 119/51.11 |

*Primary Examiner*—Hugh R. Chamblee
*Attorney, Agent, or Firm*—Burd, Braddock & Bartz

[57] ABSTRACT

An apparatus for supplying feed material to animals and poultry. The apparatus has a trough located below a hopper used to store dry feed material. A plurality of legs support the hopper on the trough. A tubular member for carrying liquid, as water, extends through the hopper and is joined to an outwardly directed lateral tubular extension. The tubular member and extension is used to dispense the liquid into the trough. A drive motor rotates the tubular member to distribute the liquid around the trough and discharge the dry feed material into the trough. A control having a sensor located in the trough is operable in response to the amount of feed material in the trough to control the supply of water to the tubular member and the motor that rotates the tubular member.

16 Claims, 6 Drawing Figures

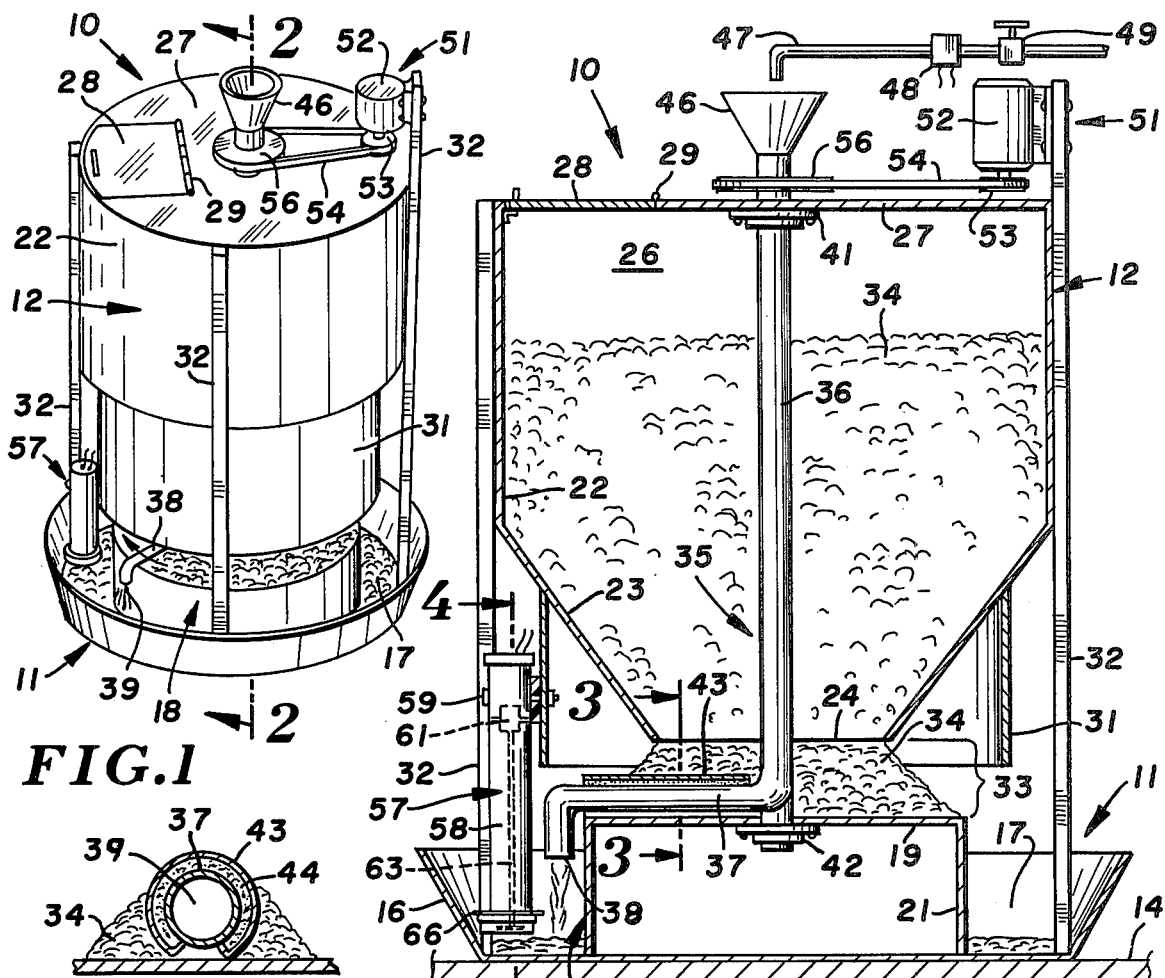
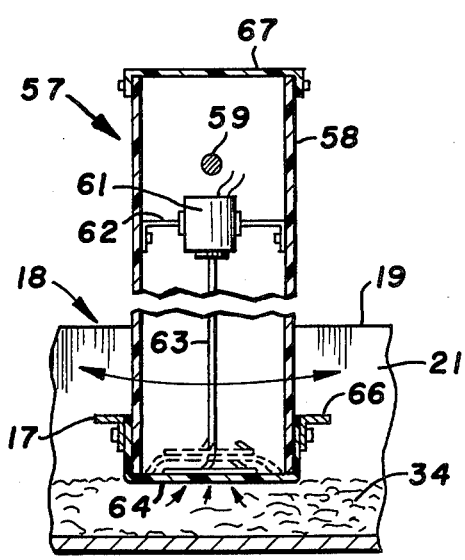
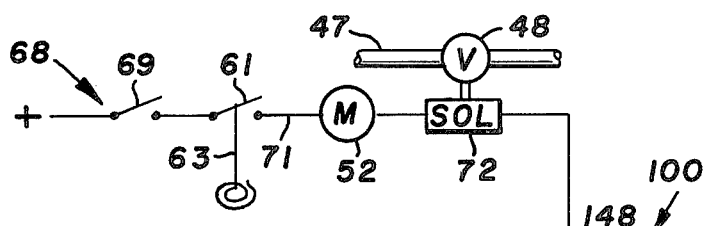
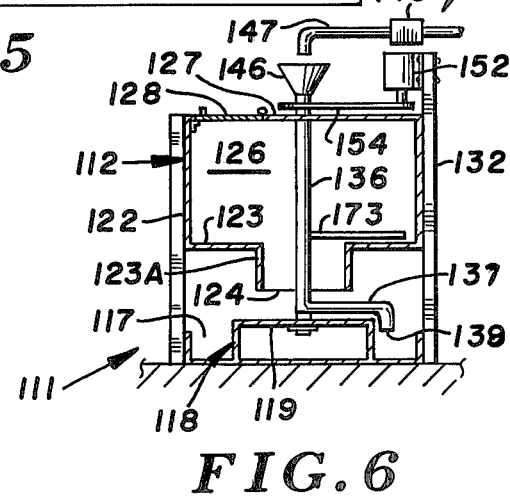

FEEDING APPARATUS

BACKGROUND OF INVENTION

Dry animal rations of ground grains, alfalfa, and concentrates have been mixed with water or whey to provide a wet feed material for animals, such as hogs. The wet feed material is more palatable to the animals. Wet feed also minimizes the wasting of the feed material in the feeding area.

DESCRIPTION OF PRIOR ART

Animal feeders are well known and are used as self feeders to supply feeds to hogs. The feeders are operable to supply both dry and wet grains. Examples of feeders that supply water to dry grain are shown in the following U.S. patents:

U.S. Pat. No. 2,111,190
U.S. Pat. No. 2,766,725
U.S. Pat. No. 3,534,708
U.S. Pat. No. 3,536,046
U.S. Pat. No. 3,547,081
U.S. Pat. No. 3,556,057
U.S. Pat. No. 3,812,823.

These feeders utilize float structures for controlling the amount of water that flows to the feeding troughs. The floats are located in separate chambers or directly in the troughs. Geerlings in U.S. Pat. No. 3,547,081 uses agitators in the dry feed to move the feed to the water chamber. The feed moves from the mixing chamber to the feeding trough. A float in the feeding trough controls the flow of water to the mixing chamber. Spray nozzles are used by Ickling in U.S. Pat. No. 3,556,057 to provide moisture to the feed in the feeding trough.

SUMMARY OF INVENTION

The invention is directed to a feeding apparatus that provides wet feed material in a feeding trough for animals, such as hogs and poultry. The apparatus has a hopper or bin for storing dry feed material. The dry feed material can be ground rations which include grains, as corn and oats, alfalfa, and concentrates. The hopper supported on the feed trough discharges the dry feed material onto a platform in the center of the feed trough. An upright member is located in the hopper. A lateral extension attached to the tubular member is positioned below the hopper discharge opening adjacent the top of the platform. A drive motor operates to rotate the member and move the lateral extension in a circular path around the platform. The extension moves the feed material off the platform into the feeding area of the feed trough. The member and extension have a common passage for carrying a liquid, as water. A liquid supply functions to discharge liquid, as water, into the passage. The water flows through the passage in the member and lateral extension into the feeding trough. A control responsive to the amount of feed material and liquid in the trough operates to control the motor and the liquid supply. When the amount of feed material and liquid in the trough reaches a predetermined level, the motor and liquid supply is cut off, thereby terminating the discharge of feed material and liquid into the trough.

The feeding apparatus is a low-cost, efficient structure for providing feed material and a liquid into a trough accessible to animals. The apparatus operates automatically in response to the amount of feed material in the feeding trough. All of the structure of the feeding apparatus, except for the water supply, is in a single structure so that the feeding apparatus can be moved to any desirable place that has a supply of water.

In the drawings:

FIG. 1 is a perspective view of the feeding apparatus of the invention;

FIG. 2 is an enlarged sectional view taken along the line 2—2 of FIG. 1;

FIG. 3 is an enlarged sectional view taken along the line 3—3 of FIG. 2;

FIG. 4 is an enlarged foreshortened sectional view taken along the line 4—4 of FIG. 2;

FIG. 5 is the electrical circuit diagram for feeding apparatus of FIG. 1; and

FIG. 6 is a vertical sectional view of a modification of the feeding apparatus.

DESCRIPTION OF PREFERRED EMBODIMENTS

Referring to the drawing, there is shown in FIG. 1 the feeding apparatus of the invention indicated generally at 10. Apparatus 10 is a self-contained unit that can be moved to any desirable location that has a liquid supply, such as water. Apparatus 10 has a feeding trough 11 located below a hopper or bin 12. The dry feed material is moved from hopper 12 into feeding trough 11 where they are accessible to animals, such as hogs and poultry. The dry feed material can be a mixture of ground grains, including corn, oats, and the like, alfalfa, or other roughage materials, and concentrates, as linseed oil meal, soybean oil meal, and the like. Other types of animal rations can be used with feeding apparatus 10.

Referring to FIG. 2, feeding trough 11 has a flat bottom or floor 13 resting on a supporting surface 14. An annular upwardly directed side wall 16 is joined to the bottom 13 to form a circular feeding area 17 for accommodating the feed material. Side wall 16 can have other shapes, as rectangular, hexagonal, or square.

A platform indicated generally at 18 is mounted in the central area of bottom 13. Platform 18 has a circular top wall 19 and an annular downwardly directed side wall 21. The lower edge of side wall 21 is secured to bottom 13. Side wall 21 forms with the side wall 16 an annular feeding area 17.

Hopper 12 is a bin or container for the dry feed material 34. Hopper 12 has an upright cylindrical wall 22 and a downwardly converging cone-shaped bottom section 23. The lower end of cone-shaped bottom section 23 has a discharge opening or exit opening 24 located above the top wall 19 of platform 18. Hopper 12 forms a chamber 26 which is closed with a top wall 27. A door 28 is pivotally mounted on top wall 27 with a hinge 29 to provide an access opening into the top of chamber 26. A cylindrical member or annular shield 31 is secured to the cone section 23 of the hopper and extends downwardly toward the feeding area 17. Cylindrical member 31 prevents the animals from moving excess feed material off of the platform 19 into the feeding area 17. Hopper 12 can be square, rectangular, or hexagonal.

Hopper 12 is supported above feeding trough 11 with a plurality of upright support legs 32. The bottom portion of each leg 32 is secured to the outer edge of bottom 13. The upper portion of each leg 32 is attached to the cylindrical wall 22 of hopper 12. Legs 32 locate the discharge opening 24 above the platform top wall 19. The vertical distance or space between opening 24 and top wall 19 is the distance 33. This space allows the feed material 34 to flow through the discharge opening 24 onto the top wall 19.

Feeding apparatus 10 has a feeding and watering means indicated generally at 35 operable to move feed material 34 off of the top wall 19 of platform 18 and provides liquid, as water, to the feed material in feeding area 17. Feeding and watering means 35 includes an upright tube or tubular member 36 joined to a lateral tubular extension 37. Member 36 is located along the upright or vertical axis of the chamber 26. The lower end of member 36 extends through opening 24. Extension 37 is located horizontally adjacent top wall 19 and has a downwardly directed end 38 that faces down into the feeding area 17. A removable nozzle can be attached to the bottom of end 38. The tubular member 36, extension 38, and end 38 have a common passage 39 which allows the liquid to flow to the feeding area 17. A first bearing 41 attached to the center of top wall 27 rotatably mounts the upper end of tube 36 to the top wall. A similar second bearing 42 secured to the center of the top wall 19 of the platform 18 rotatably supports the lower end of tubular member 36. As shown in FIG. 3, an arcuate shield 43 covering insulating material 44 surrounds the lateral extension 37. Insulating material 44 prevents moisture from accumulating on extension 37 during the summer season. This reduces caking of feed material on extension 37.

A funnel 46 is mounted on the top end of tubular member 36. The liquid is supplied to the funnel through a pipe 47. A solenoid operated valve 48 attached to pipe 47 operates to control the flow of liquid through pipe 47. A second on-off valve 49 attached to pipe 47 upstream of solenoid valve 48 is used to control the flow of liquid to the solenoid valve 48. Valve 49 is a manually operated on-off valve.

A drive means indicated generally at 51 operates to rotate the tubular member 36 and thereby move the extension 37 around platform top 19. Drive means 51 comprises an electric motor 52 secured to the upper end of a leg 32. Motor 52 has a drive pulley 53 that engages an endless V-belt 54. V-belt 54 is entrained about a driven pulley 56 secured to the upper end of tubular member 36.

A control unit indicated generally at 57 functions to control the operation of the motor 52 and the solenoid valve 48 in response to the level of the feed material 34 and liquid in feeding area 17. Control unit 57 has an upright cylinder or tube 58 located adjacent cylindrical member 31. The lower end of tube 58 is located adjacent bottom 13. A single horizontal bolt 59 attaches tube 58 to cylindrical member 31. The single bolt 59 allows the tube to pivot about a generally upright axis so that the animals have access to the feed material below the control unit.

Referring to FIG. 4, control unit 57 has a switch 61 located in tube 57. A bracket 62 mounts switch 61 on tube 58. Switch 61 has a downwardly directed actuator 63. The lower end of the actuator 63 engages a flexible diaphragm or sensor 64. Diaphragm 64 covers the lower open end of tube 58. A ring 66 surrounding tube 58 secures the diaphragm 64 to the lower end of tube 58. The top of tube 58 is closed with a cover 67.

The electrical circuit indicated generally at 68 is for the motor 52 and the solenoid valve 48 is shown in FIG. 5. Circuit 68 includes a main switch 69 connected to the control unit switch 61. Switch 69 is connected to a power source, such as the conventional 110 volt A.C. line. A conductor or line 71 connects the switch 61 with the motor 52 and the solenoid 72. Solenoid 72 functions to operate the valve 48. Switch 61 and diaphragm 64 can be replaced with a photo cell operable to sense the level of feed material under tube 58. Other types of level sensors can be used to control solenoid 72 and motor 52.

In use, dry feed material is placed in the chamber 26 of hopper 12. Control unit 57 will be in an on position when the level of feed material 34 is below the diaphragm 64. The switch 61 will be in a closed position. When the switch 69 is moved to its closed position, the motor 52 will operate. Solenoid 72 will operate to open valve 48. The motor 52 will drive the tubular member 36, thereby moving extension 37 in a circular path around the platform top wall 19 moving feed material off the platform 18. With valve 48 open, the water will flow into the funnel 46. The amount of water or rate of flow of the water can be varied according to wet feed requirements. Member 36 and extension 37 and end 39 will direct the water into the feeding area 17 behind the feed material being moved into the feeding area 17. Motor 52 will continue to operate and the solenoid 72 will hold valve 48 open as long as the feed material 34 in the feeding area 17 is insufficient to open switch 61. When the amount of feed material in feeding area 17 is sufficient to force the diaphragm in an upward direction, as shown in broken lines in FIG. 4, the switch 61 will open. This terminates the power supply to the motor 52 and solenoid 72.

Referring to FIG. 6, there is shown a modification of the feeding apparatus of the invention indicated generally at 100. The parts of the feeding apparatus 100 that are the same as the parts of the feeding apparatus 10 have the same reference numeral with a prefix 1. The apparatus has a feeding trough 111 having a feeding area 117. A platform 118 is mounted in the center area of the feeding trough 111. The platform 118 has a generally flat circular top wall 119 located below the hopper or bin 112.

Bin 112 has an upright cylindrical wall 122 and a generally flat circular bottom wall 123. The bottom wall 123 carries a downwardly directed cylindrical extension or sleeve 123A. The bottom end of sleeve 123A has an opening forming a discharge or exit opening 124. Opening 124 is spaced a short distance above the top wall 119 of platform 118. A plurality of upright legs 132 support the hopper 112 on the feeding trough 111.

An upright tubular member or tube 136 extends vertically along the axis of the hopper 112 through the discharge opening 124. A lateral extension 137 having a downwardly directed end 138 is attached to the lower end of the tube 136. Bearings (not shown) rotatably mount the upper end of tube 136 on the top wall 127 and the lower end of the tube 136 on the center of platform top 119. Tube 136 and its extension 137 are rotated by the operation of a motor 152. Motor 152 drives an endless belt 154 to rotate tube 136. Motor 152 is connected to an electrical circuit, such as the electrical circuit 68, as shown in FIG. 5.

A lateral arm 173 is secured to tube 136. Arm 173 extends in a radial direction in chamber 126 and is located immediately above bottom wall 123. The outer arm 173 terminates short of side wall 122. Arm 173 is rotated with tube 136. Arm 173 moves the feed from the outer sections of chamber 124 into the passageway of the sleeve 123A. Additional arms can be attached to the tube 136. Arms similar to arms 173 can also be attached to the tube 136 as shown in FIG. 2.

The feeding apparatus 100 has a control unit to control the operation of the motor 152 and solenoid valve 148. The control unit 157 is used with feeding apparatus 100 to control the motor 152 and solenoid valve 148 in response to the level of the feed material in the feeding area 117. The details of the circuit diagram and control unit are shown in FIGS. 4 and 5 as hereinabove described.

While there has been shown and described preferred embodiments of the feeding apparatus of the invention, it is understood that changes in the structure, such as the hoppers, feeding troughs, and control units can be made by those skilled in the art without departing from the invention.

The embodiments of the invention in which an exclusive property or privilege is claimed are defined as follows:

1. A feeding apparatus comprising: a feeding trough, a hopper having a chamber for accommodating dry feed material, said hopper having a bottom portion provided with a feed material discharge opening for directing dry feed material to the feeding trough, means supporting the hopper above the trough, an upright member located in the chamber, said upright member having an upright passage, said passage having an upper section and a lower section, a lateral extension connected to the member, and extended from the member to the adjacent feeding trough, said lateral extension having a lateral passage open at one end to the lower section of the upright passage, and open at the other end adjacent the feeding trough, means operable to direct liquid into the upper section of the upright passage, said liquid flowing through said upright passage and lateral passage into the feeding trough, means mounting the member on the hopper and trough for movement about a generally upright axis whereby the lateral extension moves with the member, drive means operable to move the member, whereby the lateral extension moves dry feed material through the discharge opening into the feed trough and discharges liquid into the feed material in the feeding trough.

2. The apparatus of claim 1 wherein: said hopper has a top wall, said means mounting the member on the hopper and trough include bearing means secured to the top wall and rotatably supporting the upper end of the tubular member on the top wall.

3. The apparatus of claim 1 wherein: the feeding trough includes a platform having a top wall located below the feed discharge opening of the hopper, said lateral extension being located above said top wall, said means mounting the member on the hopper and trough including first bearing means rotatably supporting the upper end of the member on the hopper and second bearing means rotatably mounting the lower portion of the member on said top wall.

4. The apparatus of claim 1 wherein: said drive means includes an electric motor, and means drivably connecting the electric motor to the member whereby on operation of said electric motor the member is moved.

5. The apparatus of claim 1 wherein: said lateral extension has a downwardly directed end that opens to the trough.

6. The feeding apparatus of claim 1 wherein: the drive means includes an electric motor operable to move the member and the means operable to direct liquid into the passage of the member includes a solenoid operated valve, said control means includes a switch electrically connected to the electric motor and solenoid valve and a sensing means operable in response to the level of the feed material in the trough to operate the switch, said sensing means operable to turn said switch off when the level of the feed material reaches a predetermined level, thereby terminating the operation of the electric motor and moving the solenoid valve to an off position.

7. The apparatus of claim 1 wherein: the feeding trough includes a platform having a top wall, said top wall being located below the feed discharge opening of the hopper, said lateral extension being positioned above said top wall.

8. The apparatus of claim 2 wherein: the top wall is a generally flat horizontal wall.

9. The apparatus of claim 2 wherein: said means mounting the member on the hopper and trough include bearing means rotatably mounting the lower portion of the member on the top wall of the platform.

10. The apparatus of claim 1 including: control means responsive to the amount of feed material and liquid in the feeding trough to control the operation of the drive means and means operable to direct liquid into the upright passage of the member.

11. The apparatus of claim 10 wherein: said control means includes means to sense the level of the feed material and liquid in the feeding trough, said means operable to terminate operation of the drive means and stop the discharge of liquid into the passage in response to a predetermined level of feed material in the feeding trough.

12. The apparatus of claim 10 wherein: said hopper has a top wall, said means mounting the member on the hopper and trough include bearing means secured to the top wall and rotatably supporting the upper end of the tubular member on the top wall.

13. The apparatus of claim 10 wherein: the feeding trough includes a platform having a top wall located below the feed discharge opening of the hopper, said lateral extension being located above said top wall, said means mounting the member on the hopper and trough including first bearing means rotatably supporting the upper end of the member on the hopper and second bearing means rotatably mounting the lower portion of the member on said top wall.

14. The apparatus of claim 10 wherein: said drive means includes an electric motor, and means drivably connecting the electric motor to the member whereby on operation of said electric motor the member is moved.

15. The apparatus of claim 10 wherein: the feeding trough includes a platform having a top wall, said top wall being located below the feed discharge opening of the hopper, said lateral extension being positioned above said top wall.

16. The apparatus of claim 15 wherein: said means mounting the member on the hopper and trough include bearing means rotatably mounting the lower portion of the member on the top wall of the platform.

* * * * *